United States Patent
Chan et al.

[19]

[11] Patent Number: 6,117,211
[45] Date of Patent: Sep. 12, 2000

[54] GAS DESICCATION AND CONTAMINANT DISPOSAL METHOD AND APPARATUS

[75] Inventors: Anthony Wai Pang Chan, North York; Gregory M. Martinez, Willowdale; Ralph Rackham, Toronto, all of Canada

[73] Assignee: Fuelmaker Corporation, Canada

[21] Appl. No.: 09/151,669

[22] Filed: Sep. 11, 1998

Related U.S. Application Data

[63] Continuation-in-part of application No. 08/700,502, filed as application No. PCT/CA95/00079, Feb. 21, 1994, abandoned.

[30] Foreign Application Priority Data

Feb. 21, 1994 [CA] Canada ................................ 2116089

[51] Int. Cl.[7] .......................... B01D 53/04; B01D 53/26
[52] U.S. Cl. ........................... 95/120; 95/124; 96/122; 96/128; 96/130; 96/144; 96/146
[58] Field of Search .................... 95/39, 41, 46, 95/52, 90, 95–106, 114, 117–126; 96/4, 6, 108, 121, 122, 126–128, 142, 144, 146, 8, 10

[56] References Cited

U.S. PATENT DOCUMENTS

| | | | |
|---|---|---|---|
| 2,345,774 | 4/1944 | Simpson | 95/105 |
| 2,359,660 | 10/1944 | Martin et al. | 95/124 |
| 2,570,974 | 10/1951 | Neuhart | 95/124 X |
| 2,712,981 | 7/1955 | Beggs | 95/124 X |
| 2,747,681 | 5/1956 | Schuftan et al. | 95/99 X |
| 3,303,105 | 2/1967 | Konikoff et al. | 95/52 X |
| 4,342,569 | 8/1982 | Hussmann | 95/124 |
| 4,402,211 | 9/1983 | Sugawara et al. | 96/6 X |
| 4,466,202 | 8/1984 | Merten | 95/52 X |
| 4,879,041 | 11/1989 | Kurokawa et al. | 95/46 X |
| 4,886,528 | 12/1989 | Aaltonen et al. | 96/6 |
| 4,909,810 | 3/1990 | Nakao et al. | 95/52 |
| 5,034,025 | 7/1991 | Overmann, III | 95/52 |
| 5,037,554 | 8/1991 | Nomi | 95/52 |
| 5,071,451 | 12/1991 | Wijmans | 95/52 X |
| 5,073,268 | 12/1991 | Saito et al. | 95/46 X |
| 5,240,472 | 8/1993 | Sircar | 95/52 |
| 5,281,259 | 1/1994 | Markovs | 95/125 X |
| 5,290,403 | 3/1994 | Sääsk | 96/4 X |
| 5,595,662 | 1/1997 | Sanderson | 96/4 X |

FOREIGN PATENT DOCUMENTS

| | | | |
|---|---|---|---|
| 56-076205 | 6/1981 | Japan | 96/6 |
| 60-264309 | 12/1985 | Japan | 96/4 |
| 62-064932 | 3/1987 | Japan | 96/4 |
| 63-182019 | 7/1988 | Japan | 95/52 |
| 1-027602 | 1/1989 | Japan | 96/4 |
| 1-070183 | 3/1989 | Japan | 95/52 |
| 2-009490 | 1/1990 | Japan | 96/4 |
| 2-009491 | 1/1990 | Japan | 96/4 |
| 4-200716 | 7/1992 | Japan | 96/4 |
| 6-079127 | 3/1994 | Japan | 96/4 |
| 1769934 | 10/1992 | U.S.S.R. | 96/4 |
| WO85/01058 | 3/1985 | WIPO . | |

*Primary Examiner*—Robert Spitzer

[57] ABSTRACT

Water containing contaminants is removed from a gas or liquid stream and then treated to separate the water from the contaminants. The water is separated using a condenser and a semi-permeable membrane so that it is pure enough to be disposed-of in the local environment by evaporation. The accumulated contaminants may be removed separately for controlled disposal, or reintroduced into the original stream as an alternate method of disposal.

20 Claims, 5 Drawing Sheets

GAS DESICCATION AND CONTAMINANT DISPOSAL METHOD AND APPARATUS

This is a continuation-in-part of application Ser. No. 08/700,502 filed Nov. 14, 1996, now abandoned which is a 371 of PCT/CA95/00079 filed Feb. 21, 1994.

FIELD OF THE INVENTION

This invention relates to a gas desiccation procedure and apparatus that separates water from other contaminants removed from the gas stream in the desiccation process. More particularly, the invention provides a de-watering method for natural gas streams that allows near contamination-free water to be released into the environment, and allows the non-water contaminants to be disposed of without being released into the environment.

BACKGROUND TO THE INVENTION

In the treatment of gas streams, de-watering processes generate extracted water that may contain traces of contaminants originating from the principal stream. In the case of natural gas, these contaminants include hydrogen sulphide, sulphur dioxide and mercaptans. Disposal of water containing contaminants of this type can be subject to environmental restraints.

Where natural gas is being used to power consumer vehicles, it is desirable to provide a compact gas compressor that can operate at a consumer's residence to refuel a vehicle. It is necessary in many such situation to remove the residual moisture in the natural gas during the compression process. The extracted water thereby produced cannot be released locally into the environment because of the contaminants present therein. Apart from issues relating to hazards, even trace smells of organic or sulphurous components from a natural gas stream would suggest to a consumer that a leak existed in the compressor system.

If the contaminated extracted water were to simply be accumulated, then frequent service calls would be required to remove the accumulated liquid. This invention provides a means for extending the servicing intervals for such a system.

While described in respect of removing water from natural gas, the invention can be applied to any case where water is removed from a fluid and a disposal problem exists due to the presence of contaminants in the water so removed.

The technology for drying gas and liquid streams is well established. It includes absorption and condensation methods and the use of membrane separation systems. Examples of these technologies, used separately and in combination are U.S. Pat. Nos. 5,034,025; 5,071,451 and 5,240,472 as well as the prior art referred to therein.

Further examples of prior art in this field include the published application PCT/US84/01372 (WO85/01058) filed by Pall Corporation of Glen Cove, USA and U.S. Pat. No. 2,747,681 to Schuftan et al. In this Pall application water contained in purge gas is condensed-out leaving $H_2S$ gas which is adsorbed in iron sponge beds with residual purge gas being reintroduced into the gas flow. No provision is made, however, to separate-out residual contaminants contained or mixed in with the water condensate, and then to release contaminant-free water into the environment.

In the case of Schuftan the desiccant bed is regenerated using gas from the main gas stream as a sweep gas. Water condensate is released from the system through a drain pipe without any provision for removing residual contaminants present in such water.

None of the known prior art references address the objective of treating extracted water to separate it into purified water and residual components in order to permit the removal of the contaminant-free water from the desiccation apparatus for disposal as such. No references address the issue of separating of contaminants from the extracted water and disposal of such contaminants separately from such water, with the purified water being released into the environment in a contaminant-free form. The invention herein address these concerns.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

In accordance with the present invention a drying process for a fluid stream containing water and contaminants comprises:

(1) passing a fluid stream containing water and contaminants through an adsorbent to remove water which water includes contaminants;

(2) regenerating the adsorbent with a purge gas to purge it of a substantial portion of the water and a portion of the contaminants it has adsorbed, recovering with the purge gas such water in vapour form with contaminants mixed therein;

(3) exposing the purge gas carrying the water with contaminants mixed therein, so recovered, to a separation means for separating the contaminated water into substantially contaminant-free water and residual contaminants wherein the separation means in successive stages comprises:

(a) a condenser with an inlet and outlet producing water with contaminants contained therein as a condensate and releasing the purge gas that contains residual contaminants at its outlet; and (b) a semi-permeable membrane that produces from the water condensate contaminant-free water as a permeate, followed by the further steps of:

(4) releasing the contaminant-free water permeate so separated into the environment by evaporation; and (5) introducing the purge gas with residual contaminants carried therein into the fluid stream without releasing contaminants into the environment.

In one version of the invention the water permeate is substantially purified and released into the environment as by evaporation or other convenient means.

In preferred applications of the invention, the fluid is a gas, such as natural gas.

In a further variant of the invention the non-water contaminants are disposed of by returning them to the original fluid stream. This procedure is suitable when the object is to remove water from the fluid stream, and the presence of contaminants in the fluid stream is acceptable. An example is natural gas which is to be consumed in an internal combustion engine.

In a further preferred variant of the invention, the fluid stream is a line gas which is exposed to the adsorbent at high pressure and the regeneration of the adsorbent is carried-out at reduced pressure. The regeneration of the adsorbent may be enhanced by applying heat during the regeneration stage. The dried line gas may be used to regenerate the adsorbent, with such line gas, after at least partial water removal, being returned to the fluid stream upstream from the adsorbent.

As a further variant of the invention the contaminants present in the purge gas may be adsorbed in a filter which is itself subject to regeneration. The regenerating sweep gas for this contaminants filter may reintroduce the contaminants into the original fluid stream in order to effect disposal of such contaminants. Such re-introduction may occur either upstream or downstream from the adsorbent.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

Figure 1:
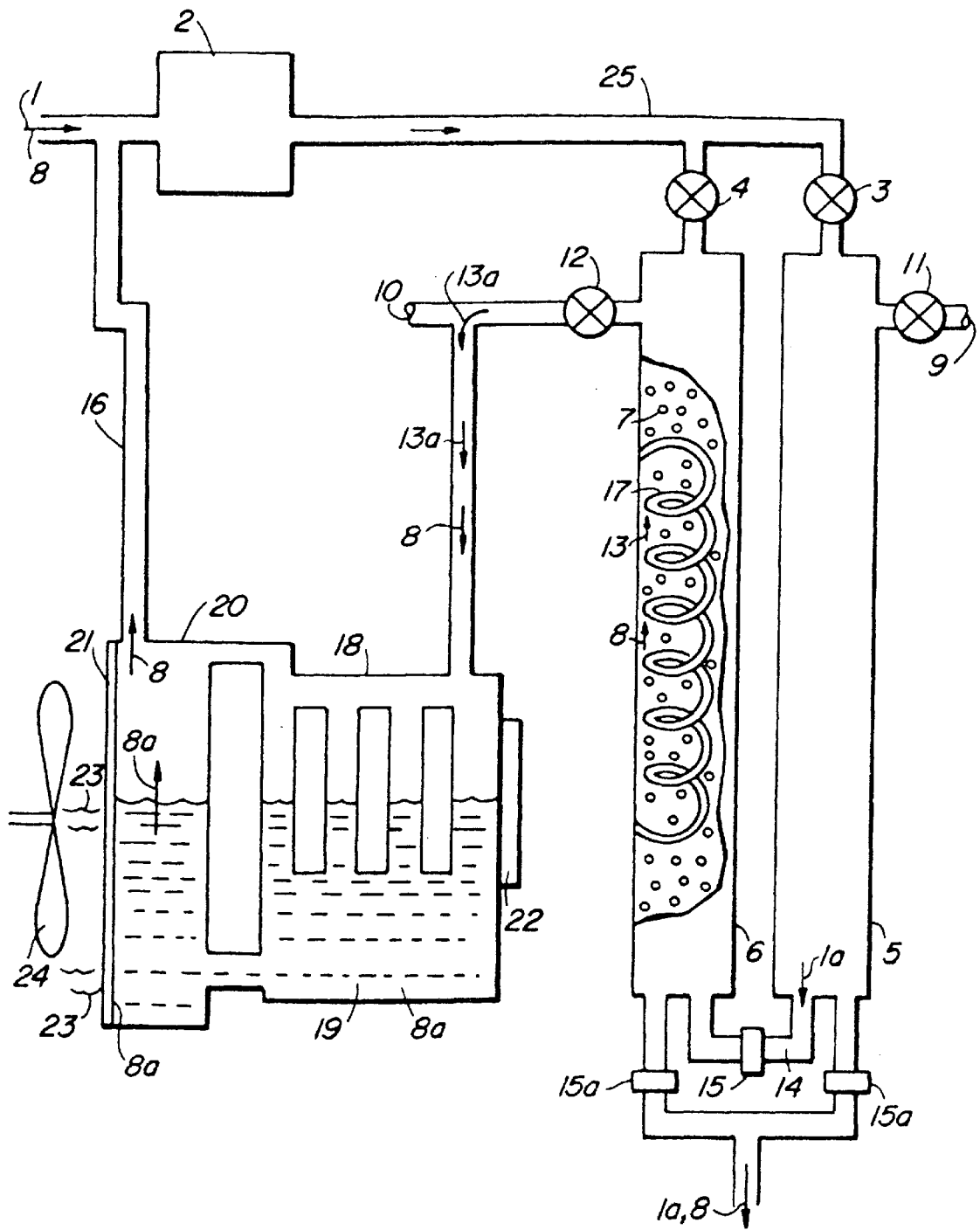
FIG. 1 is a schematic depiction of the components used to separate moisture from a gas at full, output line pressure, and the contaminants from the moisture at near the pressure of the arriving gas and a semi-permeable membrane for releasing contaminant-free water into the environment.

In FIG. 1 moisturized line gas 1 containing contaminants 8 enters the upstream side of a compressor 2 from which it proceeds under pressure through one of two alternate entrance valves 3, 4 to one of two adsorbent chambers 5, 6. A bed of desiccant material 7, such as alumina or zeolite respectively contained within such chambers 5,6, adsorbs the moisture in the gas 1, including at least some of the contaminants 8. The entrance valves 3, 4 are alternately opened to divert the gas flow 1 through the two adsorbent chambers 5, 6.

While one chamber, for example chamber 5, is being used to dry the gas flow, the desiccant 7 in the other chamber 6 is treated to regenerate it. In this case, purge valve 11 on the active chamber would be closed, and purge valve 12 on the regenerated chamber 6 would be open. The exit end 9 of purge valve 11 connects at the exit end 10 of purge valve 12 providing both columns 5,6 with access to the water/contaminant separation system described next.

The desiccant 7 is regenerated by being exposed to a sweep gas 13 preferably originating from the desiccated gas stream 1a and provided through a connecting conduit 14 joining the two adsorbent chambers 5,6 at their exit ends. This conduit 14 includes a pressure-drop orifice 15 that releases the sweep gas 13 into the chamber 6 at near the pressure of the arriving gas 1. This pressure is slightly in excess of the line pressure of the incoming gas 1, conveniently ½ psi in excess resulting in approximately 6% of the main gas stream flow being recirculated. One-way check valves 15a prevent exiting gas de-moisturized line 1a from bypassing the pressure drop valve 15. The sweep gas 13 is drawn through the adsorbent bed 7 by a return conduit 16 that leads to the lower pressure intake side of the compressor 2. Moisture in the adsorbent bed 7 is encouraged to vaporize into the sweep gas 13 by the reduced pressure condition in the regenerating column 6.

As an alternate arrangement, check valves 15a may be eliminated along with connecting conduit 14, and the pressure drop orifice 15 moved to and duplicated at each of the lines between purge valves 11,12 and the condenser 18, i.e., in the path of the moisturized sweep gas 13a as it proceeds to the water/contaminant separation system. While saving the cost of two check valves, this arrangement causes regeneration to occur at full line pressure, reducing its efficiency.

To speed the regeneration process and assist in recovery of the water subsequently a thermostatically controlled electrical element 17 warms the desiccant 7. The warm, moisturized sweep gas 13a containing contaminants 8, on passing through the open purge valve 12, enters a condenser 18. Liquified water 19 then accumulates in the bottom of the condenser 18 below the level of the return conduit 16.

As contaminants 8 may be more volatile than water, this condensation stage represents a first separation of the contaminants 8 from the moisture removed from the gas stream 1. This separation is usually not 100% efficient, however, and the condensed water 19 will still contain some contaminants 8.

As arranged in FIG. 1, the flow of moisturized sweep gas 13a over the condensed water 19 will continue as long as the adsorbent bed 7 is being regenerated. Towards the end of this process, the sweep gas 13a will contain very little moisture and contaminants. At this point more volatile contaminants 8a contained in the condensed water 19 may separate from this water 19 and re-enter the flow of sweep gas 13a. This further separates the contaminants 8 from the moisture and water 19 that has been removed from the gas flow 1.

The accumulated, partially separated water 19, including residual contaminants 8a present therein, may be simply accumulated and collected or it may then be passed to a separation chamber 20 where it is presented to a semi-permeable membrane 21. On the other side of the membrane 21, water diffusing therethrough evaporates 23. This process is accelerated by a fan 24 that maintains a constant air flow on the exterior side of the membrane 21.

A fan may also be used to cool the condenser 18. Alternately, a thermal-electric cooling element 22 may assist in chilling the condenser 18.

As water diffuses through the membrane 21, some contaminants 8a may accumulate on the interior surface of the membrane 21. Eventually, the rate of diffusion may drop to a level where the membrane 21 must be cleaned or replaced. However, this step may be delayed according to the amount of contaminants 8 separated from the water 19 upon condensation and through re-vaporization. It may also be greatly delayed by inclusion of a contaminants filter in the flow of sweep gas 13a before it reaches the condenser 18. This arrangement is described in greater detail below.

Membranes such as hydroscopic ion exchange tubes, made of modified TEFLON have been found suitable for this application, showing life-times of practical duration.

Figure 2:
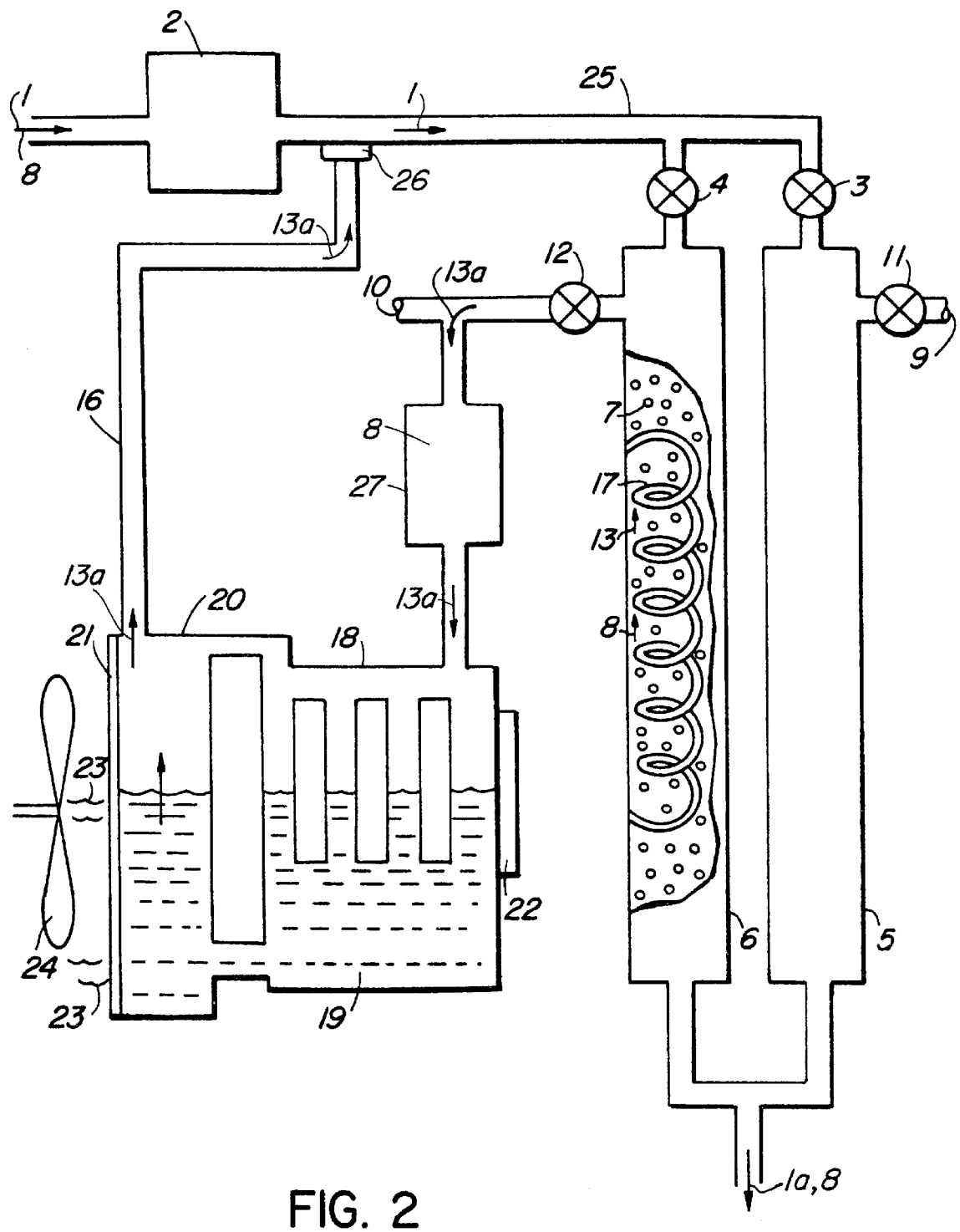
In FIG. 2 the schematic of FIG. 1 is modified to show the moisture removal process operated at near output pressure.

FIG. 1 depicts a configuration wherein regeneration occurs at a pressure that is near the incoming gas pressure. In FIG. 2, regeneration occurs at near the outgoing gas pressure.

In FIG. 2 the return line 16 connects to the gas line 25 downstream from the compressor 2. This connection is effected through a venturi orifice 26 that creates a suction making use of a pressure drop valve 15 and check valves 15a unnecessary.

In this closed loop system the circulating purge gas 13,13a is drawn through the condenser 18 to reduce its humidity, and then fed-back through the return line 16 to be delivered again to the desiccant bed 7. The two drying columns 5,6 are again regenerated alternately, permitting the drying of line gas 1 to proceed continuously through one onstream bed while the other offstream bed is being regenerated. Valves 3, 4, 11 and 12 again allow the onstream bed to be isolated from the regeneration loop during regeneration.

A carbon filter 27 may optionally be used to selectively remove organic and other contaminant compounds from the moisturized stream of purge gas 13a. This filter 27 is intended to extend the life-time of the membrane 21, delaying it from becoming blocked by contaminants. Such a filter 27, shown in FIG. 2, may serve simply as a trap for contaminants which is replaced regularly.

Figure 3:
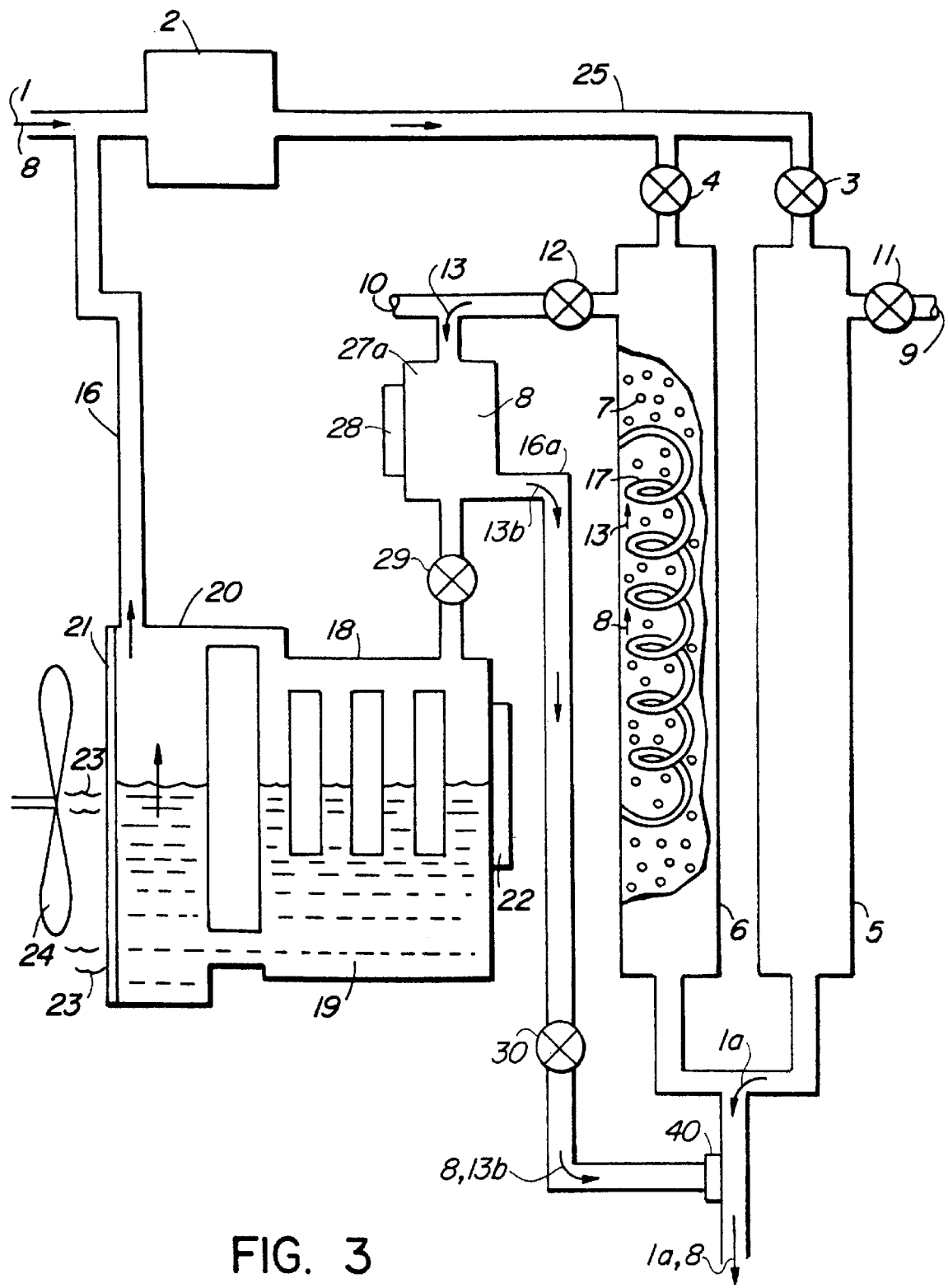
FIG. 3 shows the configuration of FIG. 2 with provision to trap and purge contaminant components, such as organics present in the extracted moisture.

A further variant of the invention is shown in FIG. 3 as a modification of the closed loop system of FIG. 2, although this additional variant may equally be applied to the configuration of FIG. 1 with appropriate adjustments.

In FIG. 3, the filter 27a for organic contaminants contains activated carbon or such other regenerable adsorbent material as will remove organic and/or sulphurous compounds, etc. from the extracted moisture and be regenerateable by the application of heat in the presence of a sweep gas.

The regenerateable filtration means 27a of FIG. 3 may be subject to a regeneration cycle that will allow the entire system to operate on a continuous closed-loop basis. Regeneration of the regenerateable filter 27a is effected by providing an intermittent flow of purge gas 13 during a filter purge cycle while the regenerateable filter 27a is being heated by heater element 28. Alternately, the purge gas 13 may be heated. Valves 29, 30 control diversion of the flow of the contaminant-laden purge gas 13b directly to the gas line downstream of the beds 5 and 6 where it joins existing line gas 1a. This process may be carried-out using diverted, dried line gas 1a as the purge gas 13 once the adsorbent bed 7 has been regenerated, without fear or re-moisturizing the line gas 1a.

The contaminant-laden purge gas 13b is shown in FIG. 3 as transporting the organic contaminants 8 through a secondary sweep gas return line 16a for disposal in the main gas stream under the influence of the pressure differential created by venturi valve 40. The main return gas line 16 may also be similarly connected through a venturi valve (not shown) to the outgoing gas 1a line, downstream from the beds 5,6 if the condensation process in condenser 18 is sufficiently efficient at removing moisture or other efficient moisture removal means are employed. Otherwise, return of the moisturized sweep gas 13a to re-enter the fluid stream upstream from the columns 5,6 will re-expose such sweep gas 13a to adsorbent 7, stripping out the residual water present therein.

Figure 4:
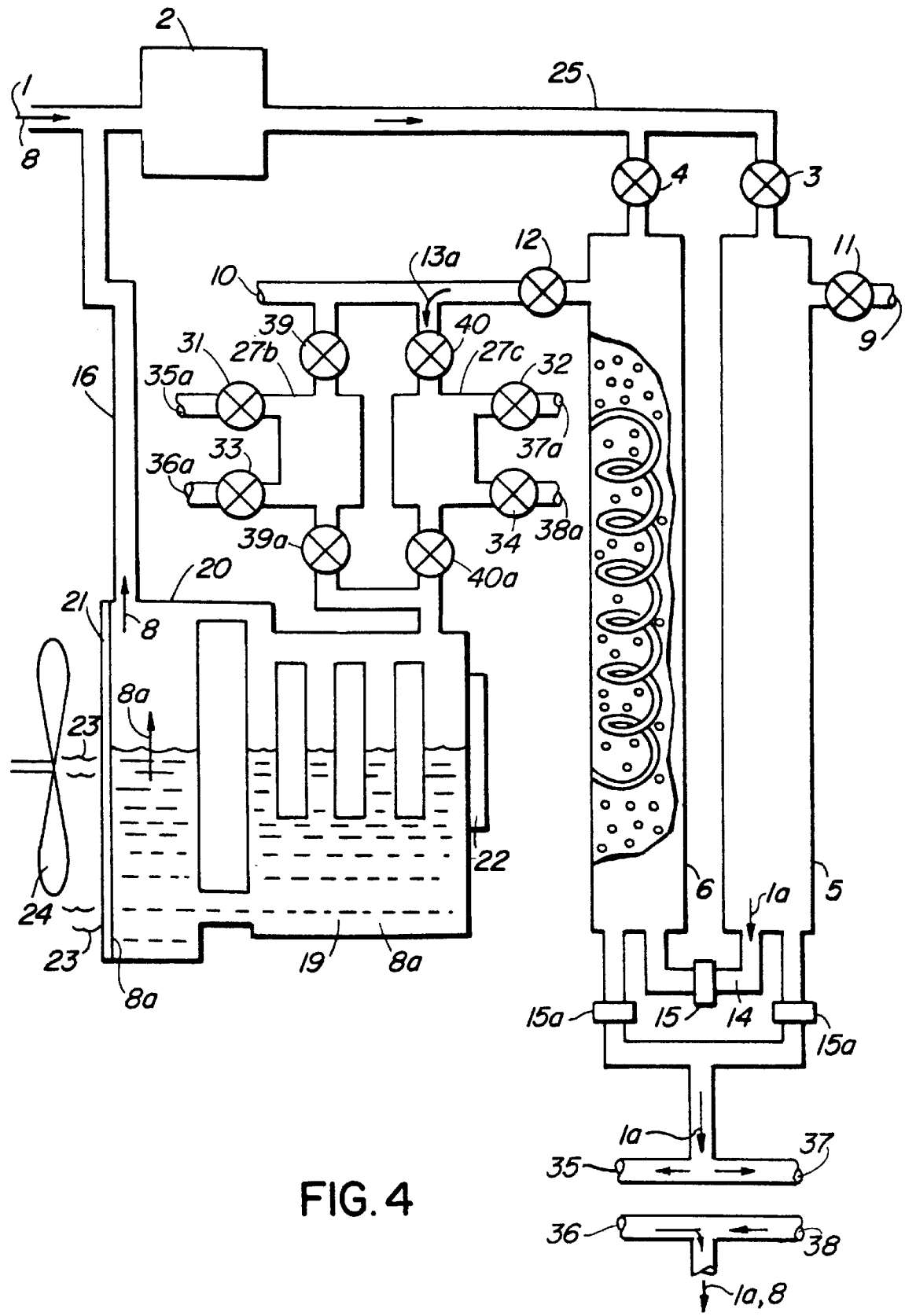
FIG. 4 shows a configuration with dual regenerateable contaminant filters, with valves and conduits to allow exiting line gas to serve the purge gas.

As another alternative to use of a single regenerateable filter 27a, dual beds of regenerable filter material similar in construction to beds 5,6 may be employed as shown in FIG. 4. Such filter beds 27b,27c may contain activated carbon or such other regenerable adsorbent material. While one bed 27b is adsorbing the organic contaminations 8, the other bed will be regenerating. Dried line gas flow 1a is routed by valves 31,33 through conduits 35,35a, 36,36a through filter 27b to regenerate the filter 27b. Valves 39,39a are closed to isolate filter 27b from the flow of moisturized sweep gas 13a. The process is then reversed with valves 31,33,40,40a closed and valves 32,34 and 39,39a opened to provide flow through conduits 37,37a and 38,38a. The adsorbed contaminants from the regeneration stream are thereby returned to the main line downstream of beds 5,6 without exposure of the line gas flow 1a to a significant amount of moisture. The regeneration process of both filters 27b,27c may be improved by use of heaters (not shown) similar to FIG. 3.

When the system of the invention is being employed to remove moisture from natural gas destined for combustion, the reintroduction of organic and sulphurous compounds into the natural gas is normally acceptable as such components were already present in the natural gas at levels which can be tolerated. If the purging of the organic filter 27a would create an unacceptably high, transient level of contaminants 8 in the main exiting gas flow 1a, then the contaminant-laden purge gas 13b may be returned to the upstream gas line 25. This will result in the drying bed 7 being used as an intermediate receiver for such compounds 8, spreading-out over time the reintroduction of contaminants 8 into the gas stream 1 at reduced levels of concentration.

The method and apparatus described is an example of the separation of water and contaminants 8 from a fluid stream (liquid or gas)1, followed by the separation of the water 19 and the contaminants 8. This latter process may be effected with less than 100% efficiency through condensation. A greatly improved efficiency of separation can be achieved through the use of semi-permeable membrane materials 21.

The disposal of both the water 19 and the contaminants 8, once separated is also addressed. The water can be disposed-of in bulk by direct removal; or it can be drained or evaporated into the environment. The contaminants 8 can be accumulated in a filter 27 and removed periodically. Alternately, contaminants 8 can be disposed of by reintroducing them into the main fluid stream 1,1a. Optionally, this may be effected by use of a regenerateable filter 27a which serves to protect the water-removing components, e.g. semi-permeable membranes 21, from exposure and degradation by the contaminants 8.

Figure 5:
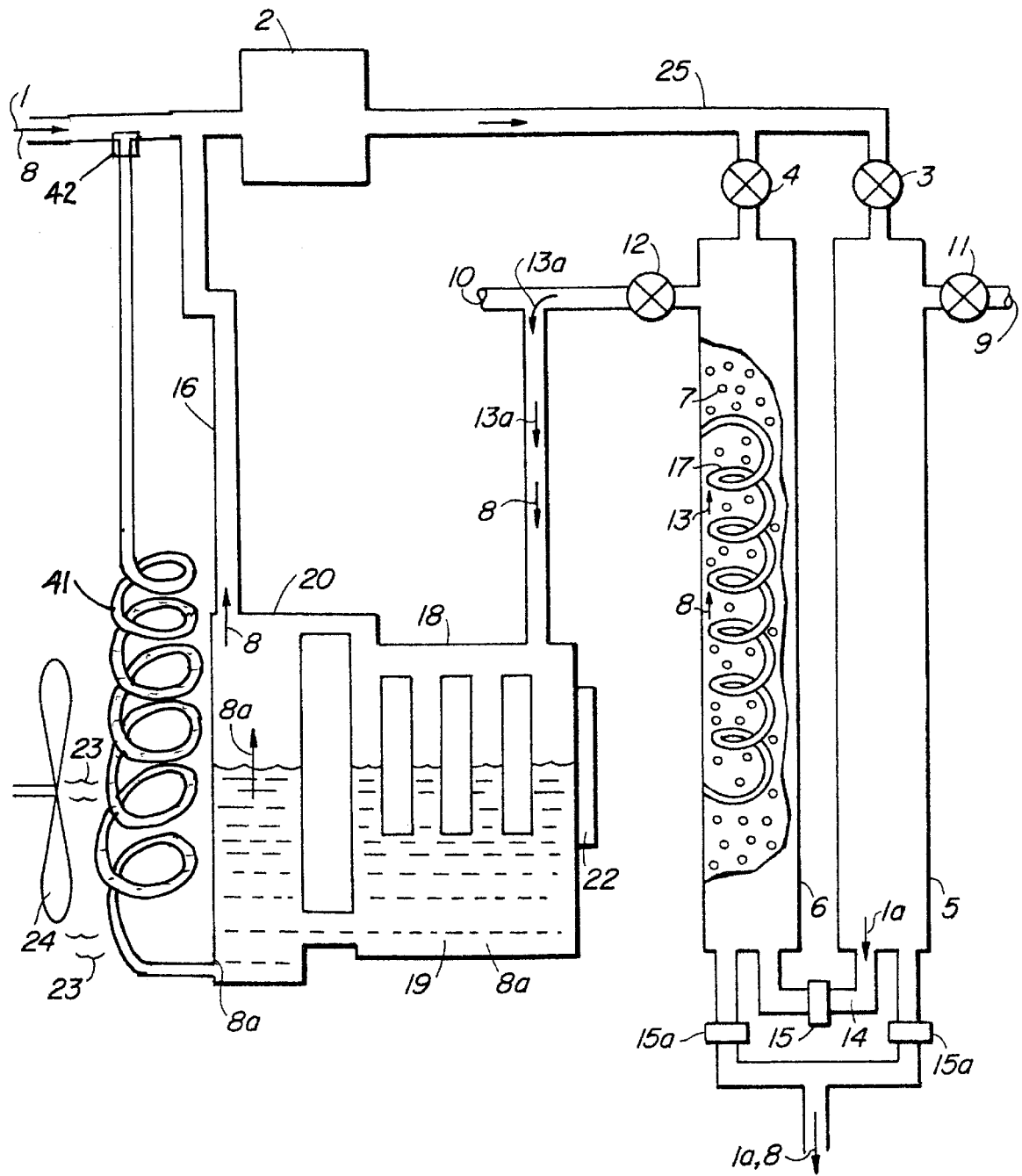
FIG. 5 shows a variation on FIG. 1 wherein the semi-permeable membrane is in the form of a tube through which water condensate is drawn by venturi suction.

In the foregoing disclosure a semi-permeable membrane 21 has been represented schematically as a plate formed as part of the wall of the separation chamber 20. FIG. 5 shows another variant in which the semipermeable membrane is shown as a tube 41. This tube is preferably formed of semi-permeable hydroscopic ion exchange membrane material referenced above.

In FIG. 5, the tube 41 is optionally exposed to a draft of air by fan 24 to enhance the flow of evaporated water 23 through the semi-permeable tube wall.

As preferred format, tubes have an inside diameter of on the order of 2 millimeters. This provides a convenient ratio of surface area to volume that facilitates dissipation of water through the tube wall. However, for small diameter bores in the tubing 41, surface tension may tend to retard migration of water along the interior length of the tube 41.

To facilitate entry of condensed water 19 into the tube 41, the end of the tube 41 remote from the separation chamber 20 may be connected to a venturi nozzle 42 at one of the conduits carrying the high velocity main fluids flow 1 upstream from the drying bed 7. This nozzle 42 develops a suction that draws condensed water 19 through the tube 41. While present in the tube, the water will migrate through the semi-permeable tube wall, leaving residual contaminants behind within the tube. Selection of a suitable length of tube 41 and a suitable size of nozzle 42 will allow all, or almost all, water entering the tube 41 to pass through the tube wall for evaporation into the environment, without any water being drawn back into the main fluid stream through the nozzle 42.

Tests have shown that this format of semi-permeable membrane performs effectively for extended periods of time. Residual contaminants 8a may commence to coat and partially block the interior of the tube 41. But this occurs progressively along the length of tube 41 beginning at the separation chamber end. By providing a suitable length of tubing 41 a section will always, for the planned lifetime of this component, remain sufficiently uncontaminated to permit passage of the condensed water as permeate through the tubing wall.

Conclusion

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property is claimed as follows:

1. A process for removing contaminant-laden water from a fluid stream and release of contaminant-free water into the environment comprising the steps of:

(1) passing a fluid stream containing water and contaminants through an adsorbent to remove water which water includes contaminants;

(2) regenerating the adsorbent with a purge gas to purge it of a substantial portion of the water and a portion of the contaminants it has adsorbed, recovering with the purge gas such water in vapour form with contaminants mixed therein;

(3) exposing the purge gas carrying the water with contaminants mixed therein, so recovered, to a separation means for separating the contaminated water into substantially contaminant-free water and residual contaminants wherein the separation means in successive stages comprises:

(a) a condenser with an inlet and outlet producing water with contaminants contained therein as a condensate and releasing the purge gas that contains residual contaminants at its outlet; and (b) a semi-permeable membrane that produces from the water condensate contaminant-free water as a permeate, followed by the further steps of:

(4) releasing the contaminant-free water permeate so separated into the environment by evaporation; and (5) introducing the purge gas with residual contaminants carried therein into the fluid stream without releasing contaminants into the environment.

2. A process as in claim 1 characterized by the fluid being a gas.

3. A process as in claim 2 characterized by the gas being natural gas.

4. A process as in claim 3 characterized in that the residual contaminants are re-introduced into the fluid stream at a point where such contaminants will pass again through the adsorbent.

5. A process as in claim 3 characterized in that the residual contaminants are re-introduced into the fluid stream at a point where they will be mixed with fluid that has been exposed to the adsorbent.

6. A process as in claim 3 characterized in that the water vapour which includes contaminants is mixed therein exposed, after being purged from the adsorbent but before being separated from the included contaminants, to a filter means that preferentially adsorbs a removed portion of the contaminants therefrom.

7. A process as in claim 6 characterized in that, following adsorption of the removed portion of contaminants by the filter means, the filter means is regenerated by a purge gas which effects removal of such contaminants and their re-deposition in the fluid stream.

8. A process as in claim 7 characterized in that, upon regeneration of the filter means, the contaminants removed therefrom are redeposited in the fluid stream at a point where such contaminants will pass again through the adsorbent.

9. A process as in claim 7, characterized in that, upon regeneration of the filter means, the contaminants removed therefrom are redeposited in the fluid stream at a point where such contaminants will be mixed with fluid that has been exposed to the adsorbent.

10. A process as in claim 7 wherein the fluid stream is a gas stream characterized in that the filter means is regenerated by exposure to a portion of the gas stream as said purge gas, which portion of the gas stream has been exposed to the adsorbent.

11. An apparatus for removing contaminant-laden water from a fluid stream comprising:

(1) an adsorbent bed with an inlet and outlet for receiving a fluid stream containing water and contaminants, and for removing water from such fluid stream, which water includes contaminants;

(2) adsorbent bed regenerating means providing a sweep gas to purge the adsorbent bed of a substantial portion of the water it has adsorbed as removed water, such removed water including contaminants; and (3) separation means for separating the removed water including contaminants from the sweep gas into substantially contaminant-free water and residual contaminants and comprising:

(a) a condenser with an inlet and an outlet producing water with contaminants contained therein as a condensate and releasing the purge gas that contains residual contaminants at its outlet;

(b) a semi-permeable membrane that produces from the water condensate contaminant-free water as a permeate; and (c) means to permit the contaminant-free water permeate to evaporate into the environment; and (4) conduit means for reintroducing the purge gas with residual contaminants carried therein into the fluid stream, whereby water may be removed from the fluid stream with no contaminants being released into the environment.

12. An apparatus as in claim 11 characterized by the fluid being a gas.

13. An apparatus as in claim 12 characterized by the gas being natural gas.

14. An apparatus as in claim 13 characterized by the semi-permeable membrane being in the form of a spiral tubing connected to the fluid stream through a venturi suction nozzle.

15. An apparatus as in claim 13 characterized by the conduit means being connected to the fluid stream at a point where such residual contaminants will be mixed with fluid that has been exposed to the adsorbent.

16. An apparatus as in claim 13 characterized by a filter means positioned to preferentially adsorb contaminants from the sweep gas after the sweep gas has purged the adsorbent of water and contaminants.

17. An apparatus as in claim 16 characterized by filter purge means to regenerate the filter by removal of contaminants adsorbed therein and filter conduit means for conveyance of the removed contaminants for re-deposition in the fluid stream.

18. An apparatus as in claim 17 characterized in that the filter conduit means connects to the fluid stream at a point where such removed contaminants will pass again through the adsorbent.

19. An apparatus as in claim 17, characterized in that the filter conduit means connects to the fluid stream at a point where the removed contaminants will be mixed with fluid that has been exposed to the adsorbent.

20. An apparatus as in claim 17 wherein the fluid is a gas characterized in that the filter purge means comprises a filter feed conduit connected between the outlet of the adsorbent bed and the filter means to provide a portion of said gas to purge the filter means.

* * * * *